Sept. 19, 1944. M. O. TEETOR 2,358,747
PARKING SYSTEM
Filed Jan. 19, 1942 3 Sheets-Sheet 2
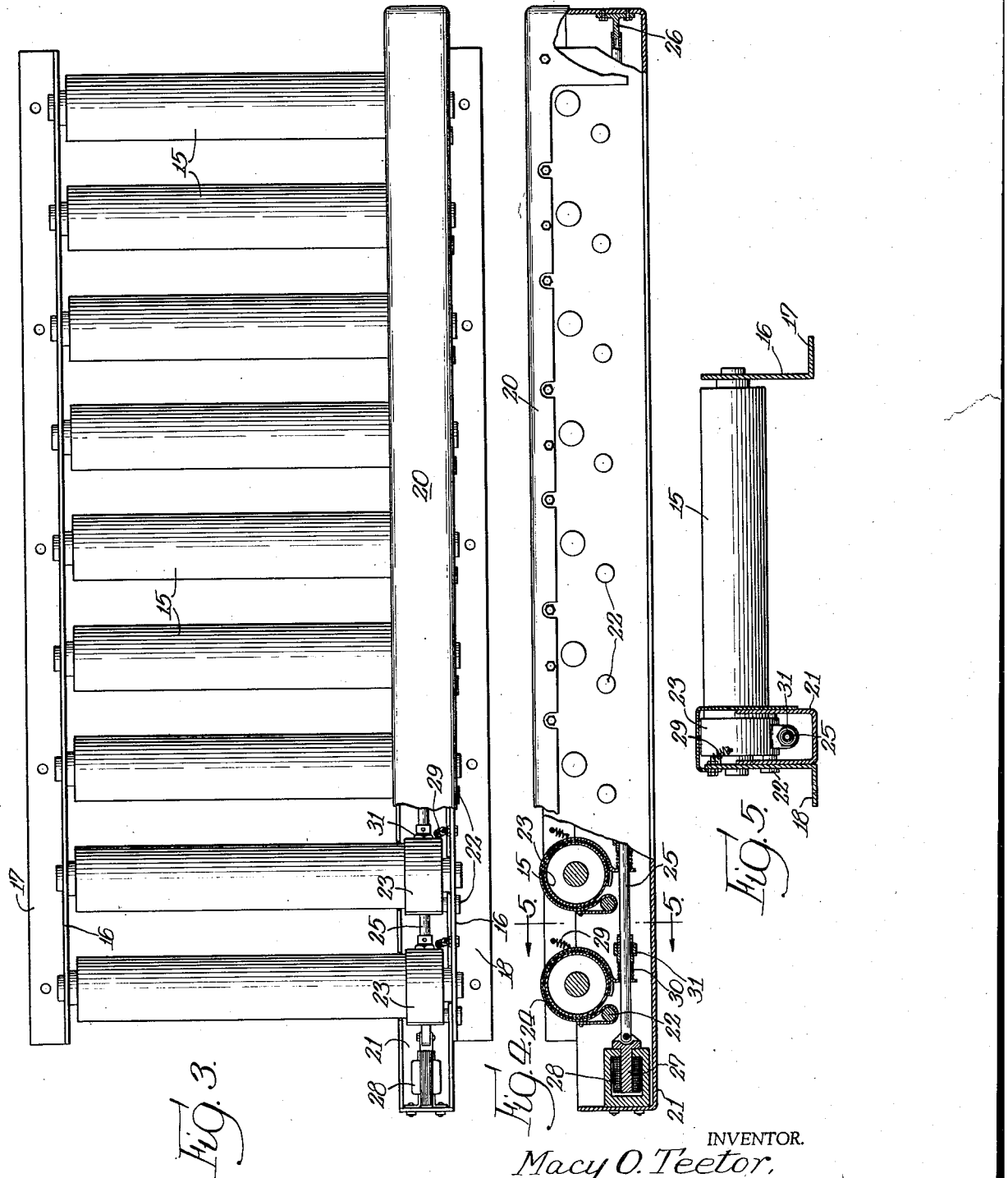
INVENTOR.
Macy O. Teetor,
BY Davis Lindsey Smith and Shonts
attys.

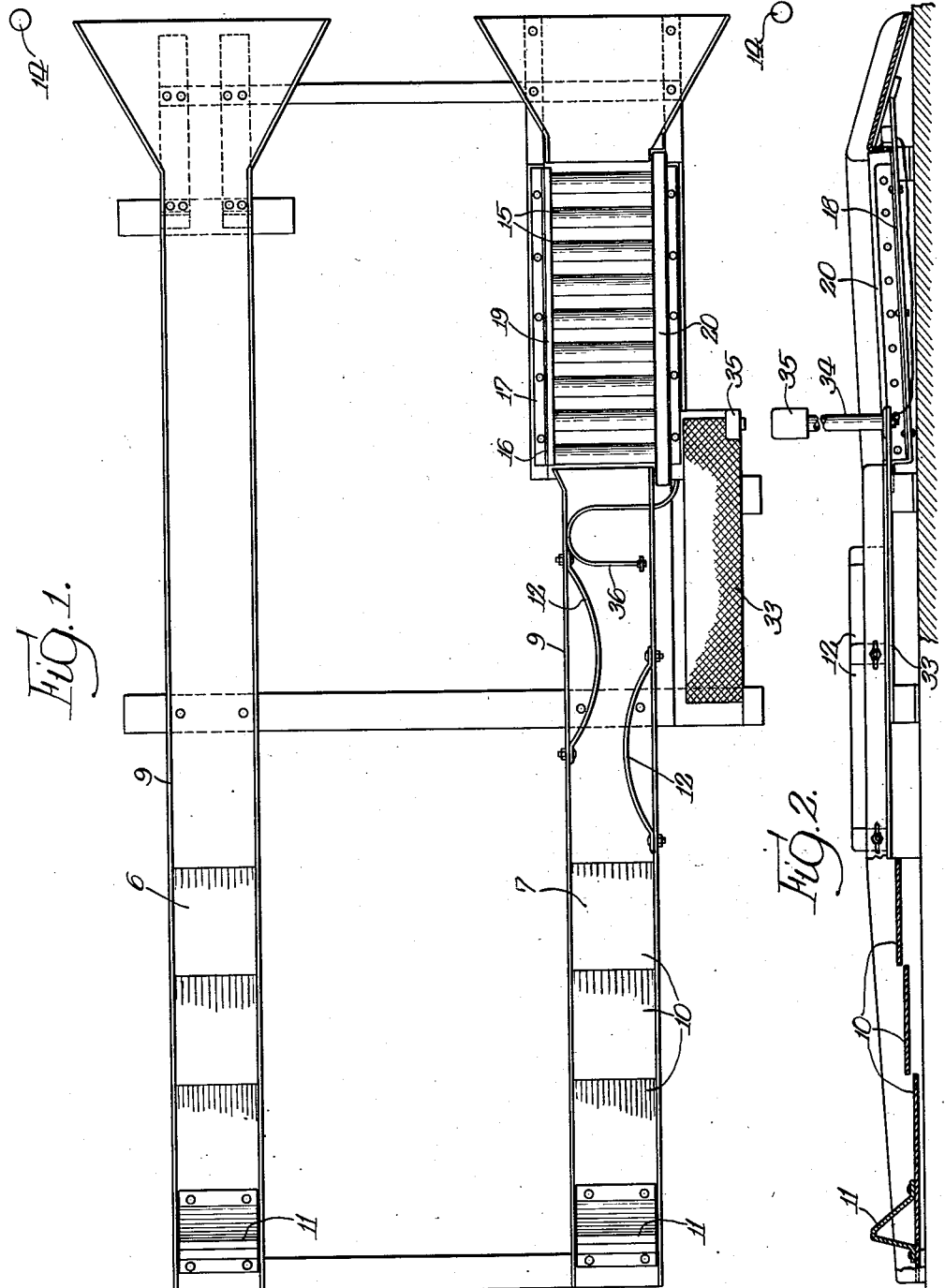

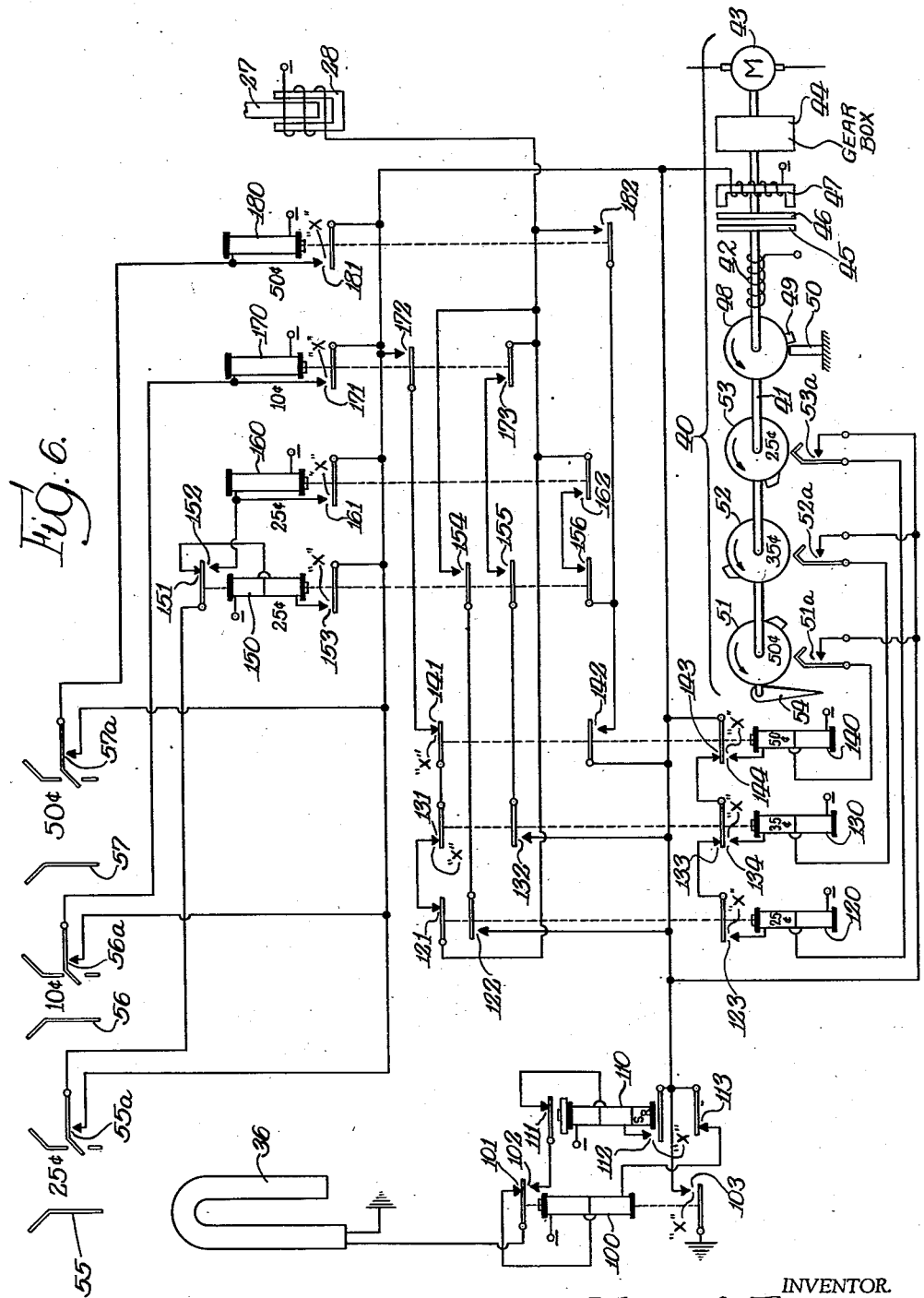

Patented Sept. 19, 1944

2,358,747

UNITED STATES PATENT OFFICE 2,358,747

PARKING SYSTEM

Macy O. Teetor, Newcastle, Ind.

Application January 19, 1942, Serial No. 427,319

22 Claims. (Cl. 194—9)

The present invention relates to parking systems and, more particularly, to improvements in apparatus for parking automobiles and similar vehicles.

It is an object of the present invention to provide an improved parking system wherein parking facilities are furnished on a metered, time-cost basis and the services of an attendant are not required.

It is another object of the invention to provide an automobile parking stall into which an automobile may be driven and from which it cannot be removed until the patron has deposited the proper number of coins in a conveniently located coin collecting device.

In accordance with the present invention, a parking stall is provided having movable means upon which at least one of the driving wheels of an automobile is supported when the automobile is in the stall. This means is normally freely movable to prevent removal of the automobile therefrom and is restrained against movement when the proper number of coins are deposited in the coin collecting device, thereby to permit the automobile to be driven from the stall. No act on the part of the patron to control the parking mechanism is required in driving the automobile into the stall, and the only act required to be performed on the parking mechanism before the automobile can be removed from the stall is that of depositing the required number of coins of the proper value into the coin collecting device.

The above and further objects of my invention and the advantages flowing from the same will become apparent from the following description taken in conjunction with the accompanying drawings in which:

Fig. 1 is a plan view of an automobile stall embodying my invention;

Fig. 2 is a side elevation view of the stall;

Fig. 3 is a plan view, partially in section, of the roller mechanism embodied in the stall shown in Figs. 1 and 2;

Fig. 4 is a side view, partially in section, of the roller mechanism shown in Fig. 3;

Fig. 5 is an end sectional view, taken along the lines 5—5, of the roller mechanism as shown in Fig. 4; and Fig. 6 illustrates the circuit arrangement of the switches and electrical control equipment for the roller mechanism.

Referring now more particularly to Figs. 1 and 2 of the drawings, the improved parking stall is illustrated as comprising two tracks 6 and 7 which are properly spaced apart on frame members to support an automobile within the stall and are each provided with suitable vertical side guard plates 9. The forward or entering ends of the tracks are inclined and flared to guide the automobile as it is driven into position on the tracks and the rear end portions of the tracks are stepped as indicated at 10, so that the automobile cannot be easily pushed or pulled backwardly off the tracks. Chocks 11 are provided at the rear ends of the tracks against which the front wheels of the automobile are adapted to engage. Positioned within the track 7 are two oppositely curved plates or guides 12, which are suitably supported on the side plates 9. One of the guides is displaced longitudinally with respect to the other in order to permit the left front wheel of an automobile to pass between the guides and at the same time prevent the rear right wheel of an automobile from passing the guides should an attempt be made to back an automobile into the stall. In a given parking area, a large number of the above-described stalls may be provided having their entering ends aligned and separated by posts 14 which are located at the forward ends of the stalls and are positioned between adjacent stalls.

In order to prevent an automobile from being driven backwardly from the stall, before the required coin deposits have been made in the manner explained below, a roller unit is provided which is located adjacent the forward end of the track 7. This roller unit, the details of which illustrated in Figs. 3 and 4 of the drawings, comprises a series of rollers 15 which are journaled at their ends in the vertical flanges 16 of two side members 17 and 18. These side members are supported by the frame work which supports the tracks 6 and 7. Suitable cover plates 19 (Fig. 1) and 20 (Figs. 1, 3 and 4) cover the bearing ends of the rollers and serve as continuations of the side guides of the track 7. A trough-like member 21 is positioned beneath the cover plate 20 to house the roller braking mechanism. One side of the member 21 is provided with spaced recesses to accommodate the rollers 15. The member 21 supports rods 22, one for each roller, to which are respectively anchored the ends of a plurality of brake bands 24. Each brake band encircles one of the rollers and is provided with a recess or hole for receiving an actuating rod 25. This rod is slidably supported at its forward end by a fixed stud 26 and is connected at its opposite end to the core 27 of a brake operating solenoid 28. The brake bands are normally held disengaged from the rollers by means of springs 29. Additional springs 30, positioned between the free ends of the brake bands and adjustable connections 31 provided on the rod 26, normally tend to force the brake bands against the rollers and to restrain the solenoid armature 27 and connected actuating rod 25 in their retracted positions.

In the illustrated embodiment of the invention, charges for usage of the stall are assessed on a metered time basis, and payment is made by depositing coins in the coin receiving chutes of a coin actuated control circuit. The equipment included in this circuit is illustrated in Fig. 6 of the drawings and the major portion thereof is housed in a box 35 which is supported by a post 34. This post is mounted on a platform 33 from which a patron may enter and leave his automobile when it is parked in the stall. The control equipment also includes a hose switch 36 of any commercial form, which is located in the track 7 between the guide plates 12 and the roller unit.

In general, the purpose of the control equipment shown in Fig. 6 of the drawings is threefold. First, it requires a minimum deposit of 10¢ before an automobile which has been driven into the stall can be removed therefrom. Second, it measures the elapsed time during which the stall is occupied, and sets up circuits requiring coin deposits of 25¢, 35¢ and 50¢ representing minimum, intermediate and maximum charges for different periods of use of the stall. To these ends, three timing relays 120, 130 and 140 and a timing device 40 are provided. This timing device includes a shaft 41 which is biased by means of a spring 42 to a normal position, and may be actuated away from its normal position on a timed basis by means of a synchronous motor 43 which is arranged to drive the shaft 41 through a gear box 44 and an electromagnetic clutch comprising the clutch plates 45 and 46 and the operating magnet 47. The normal position of the shaft 41 is determined by providing thereon a cam 48 having a lobe 49 thereon which is held against a fixed stop 50 by means of the biasing spring 42. The timing shaft 41 carries three contact control cams 51, 52 and 53 which respectively correspond to time intervals requiring deposits of 25¢, 35¢ and 50¢. This shaft also carries an indicating element 54 which may be displayed through a window in the housing of the box 35 to indicate the required coin deposit.

The third purpose of the control equipment is to prevent the solenoid armature 27 from being operated until the amount set up in the timing relays through operation of the timing device 40, is deposited in one or more of the coin chutes 55, 56 and 57. To this end, four deposit relays 150, 160, 170 and 180 are provided.

In addition to the timing and coin deposit registering equipment, two master control relays 100 and 110 are provided, the first of which is used to initiate the operation of the timing device 40 and to control the various timing and deposit relays, and the second of which is used as a reset relay for normalizing all of the equipment when an automobile is removed from the stall.

It is noted that the relays 100, 110, 120, 130, 140 and 150 are of the well-known two-step type. More specifically, the operation of the relay 100, for example, occurs in two steps, i. e., when its upper winding is energized it closes only its "X" contacts 103, but when both of its windings are energized it operates to the second step wherein the contacts 101 are opened, the contacts 102 are closed and the contacts 103 are closed. It is also pointed out that the relay 110 is of the well-known slow-to-release type. While no source of operating current for the various relays and the magnets 47 and 28 has been shown, it will be understood that a direct current source is provided, the positive terminal of which is connected to all points indicated by the ground symbol and the negative terminal of which is connected to all relay and magnet terminals identified by the negative polarity sign. Alternating current is supplied to the motor 43 from any available commercial current feeder circuit.

In considering the operation of the stall and its associated control equipment, it may first be assumed that an automobile is driven into the stall and is then removed therefrom before the minimum charge interval expires. When the front tire of the automobile initially passes over the hose switch 36 a circuit including the contacts 101 is completed for energizing the upper winding of the relay 100. As the automobile is moved further into the stall, the left rear wheel thereof moves onto the rollers 15 which are normally free to rotate. It will be seen from Fig. 2 of the drawings that the tracks and roller unit are inclined downwardly toward the chocks 11 so that the automobile will continue to move forward until the front wheels engage the chocks even though the left rear wheel spins freely on the rollers. The patron now cannot back the automobile out of the stall until he has deposited the proper number and value of coins in the coin device 35 as the rollers 15 remain free.

In operating, the relay 100 closes only its preliminary make contacts 103 to short-circuit its lower winding over a path which includes the contacts 101, 113 and 103 and the contacts of the hose switch 36. After the front tire of the automobile passes over the hose switch 36, the contacts of this switch 36 are opened. The path short-circuiting the lower winding of the relay 100 is thus interrupted, permitting the two windings of this relay to be energized in series by current flow over a path which includes contacts 103 and 113, both coils of relay 100 and the negative terminal of the coils. When thus fully energized the relay 100 opens its contacts 101 to interrupt further its operating circuit, and closes its contacts 102 to prepare the operating circuit for the slow-to-release reset relay 110. In closing its contacts 103, the relay 100 also energizes the operating magnet 47 of the clutch in an obvious circuit. When this winding is energized the clutch plates 45 and 46 are drawn into engagement to establish a driving connection between the timing shaft 41 and the motor 43, whereby rotation of this shaft in the direction indicated by the arrows appended to the cams 48, 51, 52 and 53 is started to measure a time interval.

Assuming that the cam 51 is not rotated a sufficient amount to close the associated cam springs 53a before the automobile is removed from the stall, the desired energization of the braking solenoid 28 may be obtained by the deposit of a dime in the dime chute 56. Incident to this operation, the contact springs 56a are closed to energize the dime deposit relay 170 in a circuit which also includes the contacts 103. This relay, in operating, locks up in a circuit which includes the contacts 171 and 103, and closes its contacts 172 to energize the winding of the solenoid 28 over a circuit which includes the contacts 103, 172, 141, 131 and 121 in series. When the solenoid 28 is energized, the armature 27 is attracted to move the actuating rod 26 to the left, as viewed in Fig. 4 of the drawings. Incident to this operation of the actuating rod 26, the brake shoes 24 are set to prevent rotation of the rollers and thus permit the automobile to be backed out of the stall. As the left front wheel of the automobile moves out of the stall, the contacts of the hose switch 36 are closed and then opened. When these contacts are closed the upper winding of the relay 110 is energized in a circuit which also includes the contacts 102 and 111. Upon operating to its first step, the relay 110 short-circuits its lower winding over a path which includes the contacts 103, 112, 111, 102 and the contacts of the hose switch 36. As the front tire of the automobile disengages the hose switch 36, the contacts thereof are opened to interrupt the path short-circuiting the lower winding of the relay 110, permitting the two windings of this relay to be energized in series. When thus fully energized the relay 110 completes its operation and in so doing opens its contacts 113 to deenergize the relay 100. The relay 100 now restores and opens its contacts 103 to deenergize the relay 110, the operated dime relay 170, the solenoid 28 and the clutch magnet 47. Incident to the deenergization of the magnet 47 the clutch plates 45 and 46 are disengaged, permitting the spring 42 to drive the shaft 41 back to its normal position wherein the cam loop 49 engages the stationary stop 50. Thus all of the control equipment is reset to normal.

If the automobile is parked in the stall for a period exceeding the minimum charge interval, the cam 53 is driven through an angle sufficient to cause engagement of the cam springs 53a for a short time interval. When these springs are closed, the lower winding of the quarter relay 120 is energized in a circuit which includes these cam springs and the contacts 103. Upon operating to its first step, the relay 120 closes the contacts 123 and short-circuits its upper winding over a path which includes the contacts 123, 133 and 143 and the cam springs 53a. As the cam 53 continues to rotate, the cam springs 53a are opened to interrupt this short-circuiting path, thus permitting the two windings of the relay 120 to be energized in series over a circuit which extends to ground through the contacts 123, 133, 143 and 103. The relay 120 now operates to its second step, wherein the contacts 122 are closed, the contacts 121 are opened and the contacts 123 remain closed. In this regard it will be noted that with the contacts 121 disengaged, the deposit of a dime in the dime chute 56 is ineffective to cause the energization of the braking solenoid 28.

If the automobile is parked in the stall for a period in excess of the 25¢ interval, the 35¢ cam 52 is operated to close the cam springs 52a for a short time interval. When these springs are closed, the lower winding of the 35¢ timing relay 130 is energized in a circuit which includes the cam springs 52a and contacts 103. Upon operating to its first step, the relay 130 opens its contacts 133 to deenergize the quarter timing relay 120, and closes its contacts 134 to short-circuit its upper winding over a path which also includes the contacts 143 and the cam springs 52a. At its contacts 131, the relay 130 opens another point in the above-described minimum charge circuit over which the braking solenoid 28 may be energized. The release of the quarter timing relay 120 is without effect. When the cam springs 52a are opened by the cam 52, the described short-circuiting path is interrupted, permitting the two windings of the relay 130 to be energized in series over a circuit which includes the contacts 134, 143 and 103. The relay 130 now operates to its second step wherein the contacts 132 are closed.

If the automobile is parked in the stall for a period exceeding the 35¢ time interval, the 50¢ cam 51 is operated to close the cam springs 51a for a short period. When these cam springs are closed, the lower winding of the 50¢ timing relay 140 is energized over a circuit which extends to ground through the springs 51a and the contacts 103. When thus energized, the relay 140 operates to its first step wherein the contacts 141 are opened to interrupt further the above-traced minimum charge operating circuit for the braking solenoid 28; the contacts 143 are opened to deenergize the 35¢ timing relay 130; and the contacts 144 are closed to short-circuit the upper winding of the relay 140. The release of the timing relay 130 is without effect. Shortly thereafter, the cam 51 functions to open the cam springs 51a and thus interrupt the path short-circuiting the upper winding of the relay 140. At this time, the two windings of the relay 140 are energized in series over a circuit which extends to ground through the contacts 144 and 103. The relay 140 now operates to its second step wherein the contacts 142 are closed.

After the appropriate charge circuit, corresponding to the period of use of the stall, is set up in the manner just explained, the corresponding coin deposit is required in order to actuate the braking solenoid 28. Thus if the 25¢ timing relay is operated at the time the automobile is to be removed from the rack, the deposit of a quarter in the chute 55 is required in order to energize the solenoid 28. In such case, when a quarter is deposited in the chute 55 the contact springs 55a are closed to energize the upper winding of the quarter deposit relay 150 in a circuit which also includes the contacts 151 and 103. When thus energized, the relay 150 operates to its first step wherein the contacts 153 are closed to short-circuit the lower winding thereof. After the deposited coin has passed into the chute 55, the springs 55a are opened to interrupt the path short-circuiting the lower winding of the quarter relay 150 and thus permit the two windings of this relay to be energized in series over a circuit which extends to ground through the contacts 153 and 103. When thus fully energized the relay 150 operates to its second step wherein the contacts 151 are opened to interrupt the operating circuit for the relay 150; the contacts 152 are closed to prepare the operating circuit for the second quarter deposit relay 160; and the contacts 154, 155 and 156 are respectively closed to prepare three different branch circuits over which the braking solenoid 28 may be energized. At its contacts 154 the relay 150 completes the 25¢ energizing circuit for the braking solenoid, this circuit extending from ground by way of the contacts 103, 122 and 154 and the winding of the solenoid 28 to the negative terminal of the current source.

In the event the 35¢ timing relay 130 is operated at the time the coin deposit is made, the quarter deposit relay 150 and the dime deposit relay 170 may be operated in the exact manner described above. The last of these two relays to operate closes the prepared circuit for energizing the braking solenoid 28, the circuit in this case extending from ground by way of the contacts 183, 132, 155 and 173, and the winding of the solenoid 28 to the negative terminal of the current source.

In the event the 50¢ timing relay 140 is operated at the time the coin deposit is made, either two quarters or one-half dollar may be used to pay the charge. If two quarters are deposited in the quarter chute 55 the quarter deposit relay 150 is operated in response to the first deposit in the exact manner described above. With this relay operated, the deposit of the second quarter causes the energization of the second quarter relay 160 in a circuit which includes the contact springs 55a and the contacts 152 and 103. In operating, the relay 160 locks up in a circuit which includes the contacts 161 and 103, and closes its contacts 162 to energize the braking solenoid 28 in a circuit which also includes the contacts 156, 142 and 103.

If a 50¢ piece is deposited in the chute 57 in payment of the charge, the relay 180 is energized in a circuit which includes the contact springs 57a and the contacts 103. In operating, this relay locks up in a circuit which includes the contacts 181 and 103, and closes its contacts 182 to energize the braking solenoid 28 over a circuit which also includes the contacts 142 and 103.

After any required coin deposit has been made to cause the operation of the braking solenoid 28, the operated control equipment is reset in the exact manner pointed out above when the automobile is removed from the rack. In this regard it will be understood that when the relay 110 is operated to deenergize the associated relay 100 and the latter relay restores to open its contacts 103, the magnet 47, the solenoid 28, and the operated ones of the deposit and timing relays are all deenergized and restore, thus conditioning the stall and its control equipment for further use.

I claim:

1. In an automobile parking stall, anti-traction means adapted to support at least one of the driving wheels of an automobile and including at least one element which is normally freely movable relative to rotative movement of said one wheel, thereby to prevent removal of the automobile from the stall, a coin control device adapted to be actuated upon deposit of one or more coins when it is desired to remove the automobile from the stall, a timing device adapted to condition the coin control device for operation upon deposit of a coin or coins of the proper number or denomination in accordance with the length of the parking period, means controlled by the coin control device for controlling said element to render said anti-traction means ineffective, thereby to permit the automobile to be driven from the stall, and a device operated by the automobile during entrance into the stall to start the timing operation of the timing device.

2. In an automobile parking stall, means adapted to support at least one of the driving wheels of an automobile, said means serving as an anti-traction device and normally being freely movable relative to rotative movement of said one wheel to prevent removal of the automobile from the stall, a coin control device adapted to be actuated upon deposit of one or more coins when it is desired to remove the automobile from the stall, a timing device adapted to condition the coin control device for operation upon deposit of a coin or coins of the proper number or denomination in accordance with the length of the parking period, means controlled by the coin control device for rendering said movable means ineffective as an anti-traction device to permit the automobile to be driven from the stall, a device operated by the automobile during entrance into the stall to start the timing operation of the timing device and operated by the automobile when removed from the stall to reset said timing device.

3. In an automobile parking mechanism comprising a parking stall, rollers adapted to support at least one of the driving wheels of an automobile, the rollers normally being freely movable to prevent removal of the automobile therefrom, a coin control device adapted to be actuated upon deposit of one or more coins when it is desired to remove the automobile from the stall, a timing device adapted to condition the coin control device for operation upon deposit of a coin or coins of the proper number or denomination in accordance with the length of the parking period, a device operated by the automobile during entrance into the stall to start the timing operation of the timing device, and means controlled by the coin control device for preventing rotation of said rollers to permit the automobile to be driven from the stall.

4. In an automobile parking stall, anti-traction means adapted to support at least one of the driving wheels of an automobile and including at least one element which is normally freely movable relative to rotative movement of said one wheel to prevent removal of the automobile therefrom, a coin control device, mechanism controlled by the coin control device for controlling said element to render said anti-traction means ineffective, thereby to permit the automobile to be driven from the stall, and means operated by the automobile during removal from the stall to render said mechanism ineffective.

5. In an automobile parking stall, anti-traction means adapted to support at least one of the driving wheels of an automobile and including at least one element which is normally freely movable relative to rotative movement of said one wheel, thereby to prevent removal of the automobile therefrom, a coin control device, mechanism including electrical connections controlled by the coin control device for controlling said element to render said anti-traction means ineffective, thereby to permit the automobile to be driven from the stall, and a switch operated by the automobile during removal from the stall to render said mechanism ineffective.

6. In an automobile parking stall, anti-traction means adapted to support a least one of the driving wheels of an automobile and including at least one element which is normally freely movable relative to rotative movement of said one wheel to prevent removal of the automobile therefrom, a coin control device adapted to be actuated upon deposit of a coin or coins of the proper number or denomination when it is desired to remove the automobile from the stall, mechanism controlled by the coin control device for controlling said element to render said anti-traction means ineffective, thereby to permit the automobile to be driven from the stall, and means operated by the automobile during entrance of the automobile into the stall to cause the coin control device to become operative and responsive to coin deposit for actuation thereof and operated by the automobile during removal from the stall to render said mechanism ineffective.

7. In an automobile parking stall, anti-traction means adapted to support at least one of the driving wheels of an automobile and including at least one element which is normally freely movable relative to rotative movement of said one wheel to prevent removal of the automobile therefrom, a coin control device, mechanism controlled by the coin control device for controlling said element to render said anti-traction means ineffective thereby to permit the automobile to be driven from the stall, and means operated by one of the wheels of the automobile while the same is being removed from the stall to render said mechanism ineffective.

8. In an automobile parking stall, anti-traction means adapted to support at least one of the driving wheels of an automobile and including at least one element which is normally freely movable relative to rotative movement of said one wheel to prevent removal of the automobile therefrom, a coin control device, mechanism including electrical connections controlled by the coin control device for controlling said element to render said anti-traction means ineffective, thereby to permit the automobile to be driven from the stall, and a switch operated by one of the wheels of the automobile while the same is being removed from the stall to render said mechanism ineffective.

9. In an automobile parking stall, anti-traction means adapted to support at least one of the driving wheels of an automobile and including at least one element which is normally freely movable relative to rotative movement of said one wheel to prevent removal of the automobile therefrom, a coin control device adapted to be actuated upon deposit of a coin or coins of the proper number or denomination when it is desired to remove the automobile from the stall, mechanism controlled by the coin control device for controlling said element to render said anti-traction means ineffective, thereby to permit the automobile to be driven from the stall, and means operated by one of the wheels of the automobile while the same is being installed to cause the coin control device to become operative and responsive to coin deposit for actuation thereof and removed from the stall to render said mechanism ineffective.

10. In an automobile parking stall, means permitting the automobile to be driven only forwardly into the stall, anti-traction means adapted to support at least one of the driving wheels of an automobile and including at least one element which is normally freely movable relative to rotative movement of said one wheel when the automobile is in the stall to prevent removal of the automobile therefrom, a coin control device, mechanism including electrical connections controlled by the coin control device for controlling said element to render said anti-traction means ineffective, thereby to permit the automobile to be driven from the stall and a switch operated by one of the front wheels of the automobile when the latter is driven from the stall to render said mechanism ineffective.

11. In an automobile parking stall, means permitting the automobile to be driven only forwardly into the stall, anti-traction means adapted to support at least one of the driving wheels of an automobile and including at least one element which is normally freely movable relative to rotative movement of said one wheel when the automobile is in the stall to prevent removal of the automobile therefrom, a coin control device, mechanism controlled by the coin control device for controlling said element to render said anti-traction means ineffective, thereby to permit the automobile to be driven from the stall, and a device operated by the automobile during removal of the same from the stall for rendering said mechanism ineffective.

12. In an automobile parking stall, means permitting the automobile to be driven only forwardly into the stall, anti-traction means adapted to support at least one of the driving wheels of an automobile and including at least one element which is normally freely movable relative to rotative movement of said one wheel when the automobile is in the stall to prevent removal of the automobile therefrom, a coin control device adapted to be actuated upon deposit of a coin or coins of the proper number or denomination when it is desired to remove the automobile from the stall, mechanism controlled by the coin control device for controlling said element to render said anti-traction means ineffective, thereby to permit the automobile to be driven from the stall, and a device operated by the automobile during installing of the same to cause the coin control device to become operative and responsive to coin deposit for actuation thereof and during removal of the same from the stall for rendering said mechanism ineffective.

13. In an automobile parking stall, means permitting the automobile to be driven only forwardly into the stall and to be driven backwardly out of the stall, rollers adapted to support at least one of the driving wheels of an automobile, the rollers being normally freely movable to prevent removal of the automobile therefrom, a coin control device, and mechanism controlled by the coin control device for preventing rotation of said rollers to permit the automobile to be driven from the stall.

14. In an automobile parking stall, means permitting the automobile to be driven only forwardly into the stall and to be driven backwardly out of the stall, rollers adapted to support at least one of the driving wheels of an automobile, the rollers being normally freely movable to prevent removal of the automobile therefrom, a coin control device, mechanism controlled by the coin control device for preventing rotation of said rollers to permit the automobile to be driven from the stall, and a device operated by the automobile upon removal from the stall for rendering said mechanism ineffective.

15. In an automobile parking stall, means permitting the automobile to be driven only forwardly into the stall and to be driven backwardly out of the stall, rollers adapted to support at least one of the driving wheels of an automobile, the rollers being normally freely movable to prevent removal of the automobile therefrom, a coin control device adapted to be actuated upon deposit of a coin or coins of the proper number or denomination when it is desired to remove the automobile from the stall, an electrically operable mechanism controlled by the coin control device for preventing rotation of said rollers to permit the automobile to be driven from the stall, and a switch operated by one of the front wheels of the automobile upon installing of the same to cause the coin control device to become operative and responsive to coin deposit for actuation thereof and while the automobile is being driven backward out of the stall to render said mechanism ineffective.

16. In an automobile parking stall, track means for supporting the automobile and having the portions at the rear end of the stall lower than at the entering end of the stall; a series of rollers inclined downwardly toward the rear of the stall and adapted to support at least one of the driving wheels of an automobile, the rollers being normally freely movable to prevent the removal of the automobile therefrom in the reverse direction from which the automobile was driven into the stall, a coin control device, and mechanism controlled by the coin control device for preventing rotation of said rollers to permit the automobile to be driven from the stall.

17. In an automobile parking stall, means permitting the automobile to be driven only forwardly into the stall and only backwardly out of the stall, a series of rollers inclined downwardly with relation to the entering end of the stall, the rollers being normally freely movable and adapted to support one of the rear wheels of the automobile, a coin control device, and mechanism controlled by the coin control device for preventing rotation of said rollers to permit the automobile to be driven backwardly out of the stall.

18. In an automobile stall, a series of rollers adapted to support one of the driving wheels of the automobile, brake mechanism for applying braking action to said rollers and including a solenoid for controlling the application of braking action to said rollers, a coin control device, means controlled by said coin control device for causing said solenoid to effect operation of said braking mechanism to apply braking action to said rollers, a switch operated upon removal of the automobile from the stall, and means controlled by operation of the switch for effecting the release of said brake mechanism.

19. In an automobile parking stall, a series of rollers adapted to support one of the driving wheels of the automobile, brake mechanism for applying braking action to said rollers and including a solenoid for controlling the application of braking action to said rollers, a coin control device adapted to be actuated upon deposit of a coin or coins of the proper number or denomination when it is desired to remove the automobile from the stall, means controlled by said coin control device for causing said solenoid to effect operation of said braking mechanism to apply braking action to said rollers, and means operated upon installation of the automobile into the stall to cause the coin control device to become operative and responsive to coin deposit for actuation thereof and operated upon removal of the automobile from the stall to effect the release of said brake mechanism.

20. In an automobile parking stall having at least one track, a series of rollers adjacent the entrance end of said track for supporting one of the driving wheels of the automobile, brake mechanism for applying braking action to said rollers and including a solenoid for controlling the application of said braking action to said rollers, a coin control device, means controlled by said coin control device for causing said solenoid to effect operation of said braking mechanism to apply braking action to said rollers, a switch operated upon removal of the automobile from the stall, means controlled by operation of the switch for effecting release of said brake mechanism, and means permitting the automobile to be driven forwardly into the stall and preventing automobile from being backed into the stall.

21. In an automobile parking stall having at least one track, a series of rollers adjacent the entrance end of said track for supporting one of the driving wheels of the automobile, brake mechanism for applying braking action to said rollers and including a solenoid for controlling the application of said braking action to said rollers, a coin control device adapted to be actuated upon deposit of a coin or coins of the proper number or denomination when it is desired to remove the automobile from the stall, means controlled by said coin control device for causing said solenoid to effect operation of said braking mechanism to apply braking action to said rollers, a switch operated by one of the front wheels of the automobile upon installation of the latter in and upon its removal from the stall, means controlled by operation of the switch upon installation of the automobile in the stall for causing said coin control device to become operative and responsive to coin deposit for actuation thereof, means controlled by operation of the switch upon removal of the automobile from the stall for effecting release of said brake mechanism, and means permitting the automobile to be driven forwardly into the stall and preventing the automobile from being backed into the stall.

22. In an automobile parking stall, means adapted to support at least one of the driving wheels of an automobile, said means serving as an anti-traction device and normally being freely movable relative to rotative movement of said one wheel to prevent removal of the automobile from the stall, a timing device for registering the period of time the automobile is in the stall, mechanism controlled by said timing device for rendering said movable means ineffective as an anti-traction device to permit the automobile to be driven from the stall, and a device operated by the automobile during entrance into the stall to start the timing operation of the timing device.

MACY O. TEETOR.